United States Patent Office 3,151,436
Patented Oct. 6, 1964

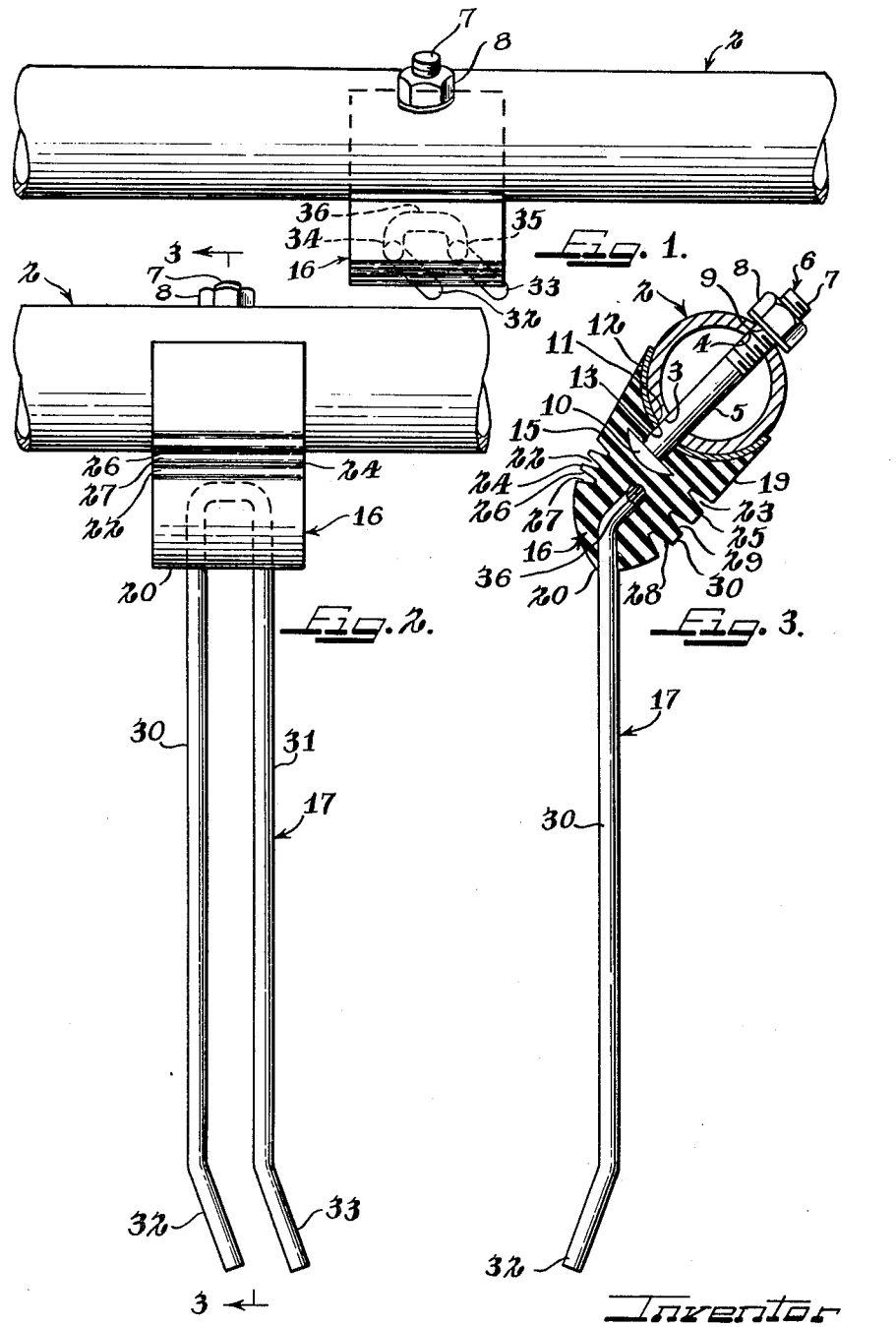

3,151,436
SIDE DELIVERY RAKE TOOTH MOUNTING
Edward J. Johnston, La Grange Park, Ill., assignor to International Harvester Company, Chicago, Ill., a corporation of New Jersey
Filed Nov. 8, 1961, Ser. No. 150,920
2 Claims. (Cl. 56—400)

This invention relates to side delivery rakes and more specifically to a novel mounting of the teeth with respect to the tooth bars.

Various rubber mountings or mountings of rake teeth in elastomer material have been proposed. However, most of these suffer from various deficiencies, the principal of which is that the mounting generally has a short life or that it is extremely expensive and therefore not particularly practicable for application to a side delivery rake.

A general object of the invention is to provide a novel, simple and efficient rake tooth mounting therefor which incorporates a body of elastomer material serving as the deflecting element to accommodate the tooth to various terrain conditions.

A more specific object of the invention is to provide a novel rake tooth mounting which incorporates steel or metallic teeth preferably formed in the shape of a U, the legs of which form the tines and the bight of which serves as a mounting within the body of elastomer material in which the bight portion as well as the upper portions of the legs are embedded, the body or block of elastomer material extending diagonally downwardly and forwardly from the associated tooth bar support so that the material is caused to be stressed in tension rather than in compression as is the case of conventional rubber mountings.

The invention encompasses the provision of a block of elastomer material of novel form which includes serrations at its upper and lower sides to enhance the flexibility of the block of material.

A further object of the invention is to provide a novel, simple and efficient mounting which includes a concave metallic backing element through which extends the shank of a bolt, the head of the bolt projecting into the body of elastomer material and forming an enlarged anchor therewith about which the elastomer material is molded and the shank adapted to project through openings in the tooth bar and having a threaded free end for application of a conventional securing nut.

These and other objects and advantages inherent in and encompassed by the invention become more readily apparent from the specification and the drawings, wherein:

FIG. 1 is a fragmentary plan view of a tooth bar in its normal position illustrating the novel tooth structure mounted thereto;

FIG. 2 is a front elevational view of the structure; and

FIG. 3 is a transverse vertical sectional view taken on line 3—3 of FIG. 2.

Describing the invention in detail, there is shown a tooth bar or a support generally designated 2 which in the present instance is preferably cylindrical or tubular, the tooth bar being provided with a pair of diametrical openings 3 and 4 which are disposed on a forwardly and downwardly inclined axis (considering that the tooth bar is maintained in a substantially horizontal position) transverse to the direction of movement of the unit as well understood by those skilled in the art.

The openings 3 and 4 admit the shank portion 5 of a bolt or securing element generally designated 6 which has a free threaded end portion 7 to which is applied a nut 8 which is adapted to abut as at 9 against the backside of the bar for securing the bolt thereto with attendant drawing up of the bolt head 10 at the other end of the shank 5 toward the forward side 11 of the tooth bar and bringing the metallic concave backing member 12 in complementary engagement with the forward side 11 of the bar. It will be noted that the member 12 is somewhat C-shaped in end view and that it is provided with a central opening 13 through which the shank portion 5 of the bolt extends, the shank portion 5 projecting forwardly of the portion 13 and having its head portion 10 embedded within the body of elastomer material generally indicated 16 which is formed of rubber or rubber-like material providing a resilient mounting for the tooth structure generally designated 17.

It will be noted that the body of elastomer material 16 which may be termed a pad or a block is elongated in a forward downward direction and is tapered at its top and bottom sides 18 and 19 to an apical end 20.

The top and bottom sides of the block are provided with slots 22 and 23 which are defined by intervening ribs 24 and 25, the slots and the ribs running lengthwise of the bar. It will be observed that the sides 26 and 27 of the ribs 22 converge sharply so that upon the body 16 flexing at its end 20 upwardly the flexibility is generally uninhibited but in fact enhanced. The bottom ribs, however, have their front and rear sides 28 and 29 converging downwardly at a less acute angle so that the bottom edges 30 of each rib presents a substantially blunt area. It will be noted that the spacing at the outer extremities of the slots 23 between the lower ribs is considerably less than if the sides so converged as to present sharp points or edges along the bottom or outer extremities of the ribs 25, 25. This is purposely intended in order to obtain a sufficient section of material in the ribs so that upon the tooth structure 17 springing rearwardly, that is, with the point 20 moving downwardly as the teeth engage the hay, that sufficient resistance will be presented to the deflection of the tooth in order to insure good tooth action in raking the hay. Thus it can be said that in an upward direction the block of material is more yieldably than in a downwardly and rearward deflecting direction.

It will be observed particularly from a consideration of FIG. 2 that the tooth structure 17 comprises a generally U-shaped form having a pair of vertically extending leg portions 30 and 31 which are generally arranged in parallel relationship, said tooth portions 30 and 31 having lower end portions 32 and 33 which are angled forwardly and laterally. The upper ends of the tooth portions 30 and 31 extend upwardly into the elastomer material slightly below the apex 20 of the body portion of the support and have upper end portions 34 and 35 respectively, which are angled diagonally upwardly and rearwardly somewhat parallel to the axis of the shank 5 of the bolt and the upper rear extremities of these portions 34 and 35 are interconnected by a cross-member or bight portion 36 which generally parallels the support 2. It will be seen that the bight is spaced forwardly and downwardly with respect to the head 10 of the bolt and that there is no metal to metal contact between the tooth and the securing element of the resilient support.

It will be noted that the teeth 30 and 31 are so oriented that upon the imposition of an upward load at the outer points 32 and 33 in a vertical direction the block of elastomer material will be deflected upwardly with attendant elevation of the tooth strurture and rotation of the apex 20 upwardly and compression of the upper side of the block and extension of the lower side.

It will be appreciated that upon the tooth structure 17 raking hay there is a tendency for the tooth structure to be moved rearwardly, that is, swinging the apex or apical point 20 downwardly which tends to stretch the top side of the elastomer block and to compress the lower side with attendant swinging movement of the tooth structure 17. It will be observed that in view of the thickness of the ribs and the minimal widths of the slots that the slots 23 quickly close up and that adjacent ribs 25 abut each other side-by-side so that the rubber in this area is placed in compression which tends to increase the resistance to further deflection of the teeth.

It will be realized that a simple, resilient support structure is provided for the tooth and that the downward and forward inclination of the block which has its thinnest section in vertical planes as respects to the horizontal planes enhances the flexibility of the block which is further augmented by the slotted nature of the top and bottom areas of the block such that the block of material is advantageously utilized to resist strenuous loadings on the tooth structure and in effect is more flexible in a vertical plane than in a horizontal plane, that is, upon the tooth moving upwardly than when the tooth moves downwardly and rearwardly.

Having thus described a preferred form of the invention, it will be recognized that various other departures from the structure specifically shown will become readily available and apparent to those skilled in the art within the scope of the appended claims.

What is claimed is:

1. In a rake tooth mounting from a rake bar, a block of resilient material having opposite ends and having top and bottom sides, means for connecting one end of the block to the rake bar, rake tooth means connected to the opposite end of the block and depending therefrom, said block having a plurality of spaced indentations on said top side and other spaced indentations on said bottom side transverse to said tooth means, the indentations on the top side being smaller than those on the bottom side to provide resistance to deflection of the block in an upward direction to a force of lesser magnitude than in a downward direction.

2. The invention according to claim 1 and said top and bottom sides of the block converging downwardly and forwardly of the bar.

References Cited in the file of this patent

UNITED STATES PATENTS

| | | |
|---|---|---|
| 2,583,767 | Daignas | Jan. 29, 1952 |
| 2,704,150 | Scranton | Mar. 15, 1955 |
| 2,909,889 | Gustafson | Oct. 27, 1959 |
| 2,931,161 | Johnston | Apr. 5, 1960 |
| 3,019,586 | Gustafson | Feb. 6, 1962 |
| 3,031,835 | Gustafson | May 1, 1962 |

FOREIGN PATENTS

| | | |
|---|---|---|
| 1,193,150 | France | Apr. 27, 1959 |